May 2, 1939.　　　　R. SEIDEL　　　　2,157,088
SPEED REGULATING DEVICE
Original Filed May 1, 1936　　2 Sheets-Sheet 2

Inventor.
Rupert Seidel

Patented May 2, 1939

2,157,088

UNITED STATES PATENT OFFICE 2,157,088

SPEED REGULATING DEVICE

Richard Seidel, Dresden, Germany, assignor to Vasanta Maschinenfabrik A.-G., Dresden, Germany Original application May 1, 1936, Serial No. 77,387. Divided and this application November 18, 1936, Serial No. 111,498. In Germany May 3, 1935

5 Claims. (Cl. 74—571)

This invention relates to a device for regulating the speed of driven members by means of a member adjustable as to its eccentricity during operation, and the present application is a divisional application from my co-pending application Ser. No. 77,387, filed May 1, 1936.

According to the invention, adjustment is effected by a rack arranged on the driving shaft and axially movable thereto, which transforms its motion into a radially directed motion of the eccentric adjustment by means of a toothed wheel and a second rack. The axially movable rack can be operated from the outside and, by means of an interposed bearing taking up axial and radial forces, is displaced by the rotation of a member arranged on the thread of another stationarily disposed member. The member adjustable as to eccentricity is balanced by causing a disc radially adjustable to the driving shaft and compensating the centrifugal forces of the eccentrically adjustable member to be in engagement with a toothed wheel actuating the eccentric member.

By way of example, the drawings illustrate one embodiment of the regulating device according to the invention as applied to a transmission gear capable of regulating speed without gradation from zero up to maximum, in which the eccentrically adjustable member rotates and drives rocking levers of control mechanisms arranged in a circle around the driving shaft, the driven members of the control mechanisms operating on a joint central toothed wheel.

Figure 1:
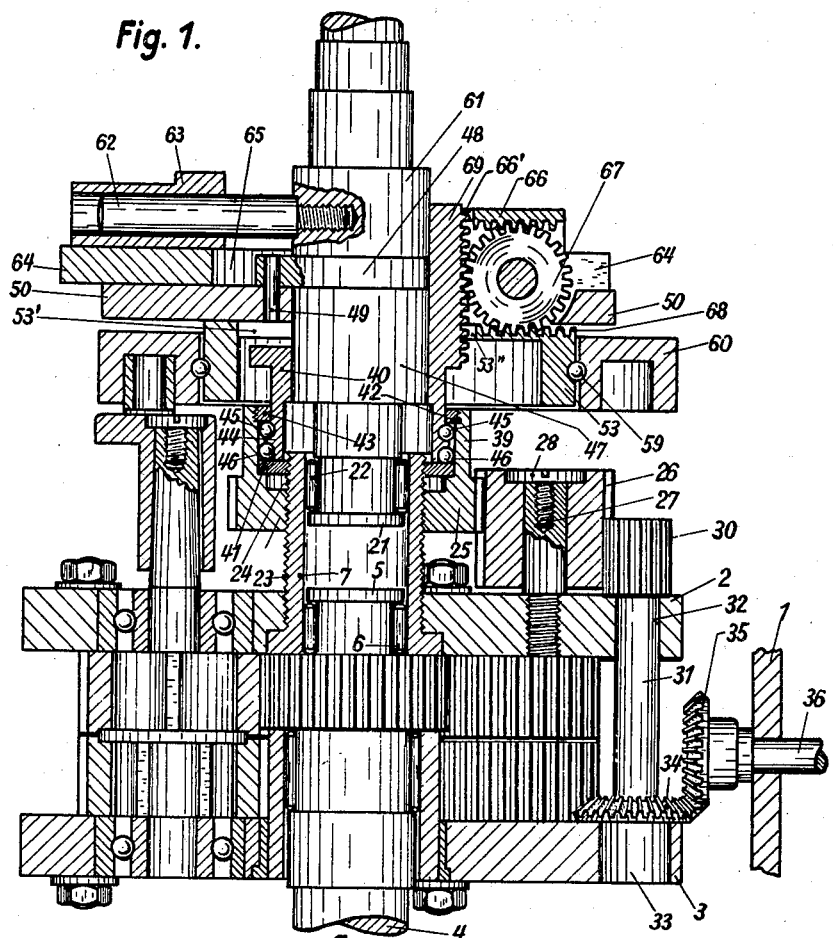
Figure 4:
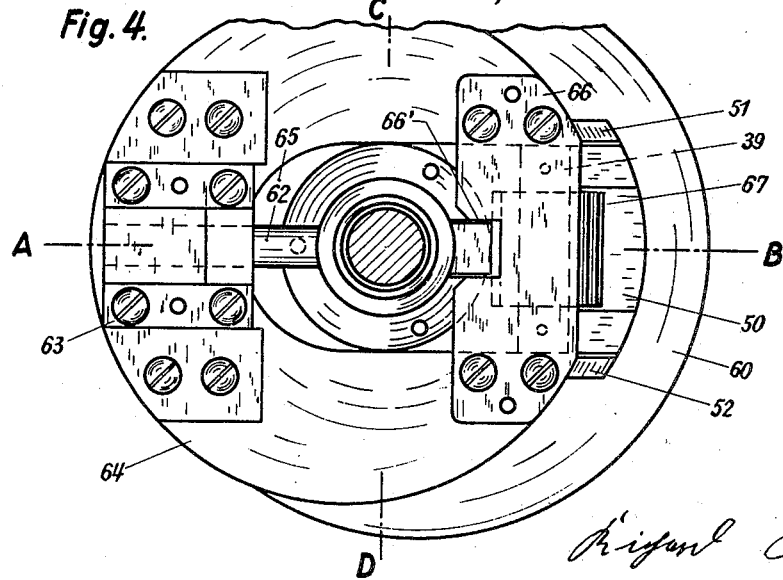
Figure 2:
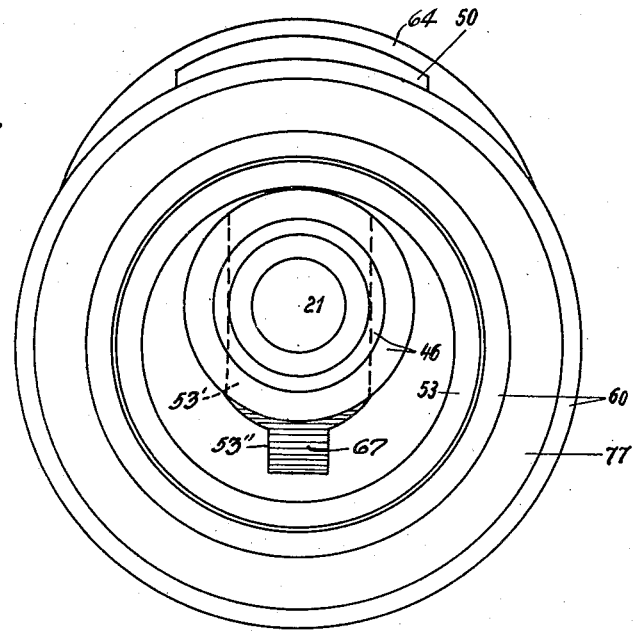
Figure 3:
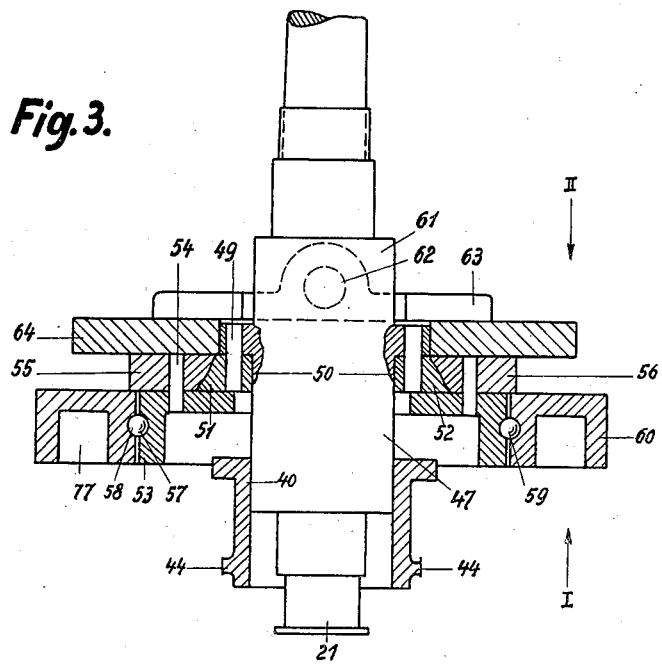

In the drawings, Figure 1 is a longitudinal sectional view, partly in elevation of the gear on the line A—B, of Fig. 4; Fig. 2, a view of the driving member with grooved disc in the direction of the arrow I according to Fig. 3; Fig. 3, a longitudinal sectional view of the driving member on the line C—D, of Fig. 4, the driving member being turned 90° compared with Fig. 1; and Fig. 4, a view of the driving member in the direction of the arrow II, of Fig. 3.

Referring to the drawings, on the driven side of the machine casing 1 partitions 2, 3 are provided for carrying the driven shaft 4. By means of an interposed pin bearing 5 the front end 6 of the shaft 4 is arranged in a bush 7 the lower end of which is firmly connected with the wall 2.

The driving shaft 20 arranged on the driving side of the casing 1 has its front end 21, by means of an interposed pin bearing 22, positioned in the bush 7 firmly connected with the wall 2. The bush 7 is provided with external thread 23 which is engaged by the internal thread 24 of an element 25 fitted with a toothed rim. This rim is in mesh with a spur gear 26 rotatably arranged on a pin 27 disposed in the wall 2, a cap screw 28 preventing the gear 26 from dropping out. The spur gear 26 possesses teeth of a length permitting axial displacement of the toothed rim 25 and is in mesh with a pinion 30 the shaft 31 of which is positioned in the bores 32, 33 of the walls 2, 3.

Keyed to the shaft 31 is a bevel gear 34 which is in engagement with a companion bevel gear 35 arranged in the casing 1. The control shaft 36 carries a hand wheel, not shown, or other suitable means for adjusting the gearing. The element 25 fitted with the internal thread 24 and axially displaceable by the turning of the hand wheel has a neck member 39 which is arranged on a sleeve 40 by means of a bilaterally acting thrust bearing taking up axial and radial pressures. The thrust bearing comprises a pressure ring 41 and a ring 43 connected with the neck 39 by the thread 42, the rings sustaining from without two ball bearings 45, 46 supported by the collar 44. The front end of the sleeve 40 is axially displaceably arranged on the collar 47 of the driving shaft 20.

On the collar 47 a larger collar 48 is provided to which the guide plate 50 is secured by means of the pins 49. The plate 50 is provided with dovetailed edges 51, 52 on which the dovetailed guide bars 55, 56 slide which are connected with the guide ring carrier 53 by the pins 54. The carrier 53 is fitted with a semicircular groove 57 for the reception of the balls 58 which engage the semicircular groove 59 of the eccentric member formed as guide ring 60.

Near the collar 48 another collar 61 is fitted with a radially outwardly directed guide pin 62 which slides in the guide piece 63 of the disc 64 the central recess 65 of which is so dimensioned that the collar 48 of the shaft 20 will freely pass through even at radial adjustment of the disc. On the side of the disc opposite the guide piece 63 a rack 66 is in mesh with a toothed wheel 67 arranged in the guide bars 51, 52 of the guide plate 50. The toothed wheel 67 engages with its opposite portion the toothing 68 of the carrier 53. Vertically to the toothings 66 and 68 the toothed wheel 67 is engaged by a rack 69 connected with the sleeve 40. The rack 69 is curved at its back so as to be guided on the collars 47 and 61 of the shaft 20.

Owing to the rotation of the control shaft 36 the meshing bevel gears 35 and 34 will be moved, whereby the pinion 30 on the shaft 31 is caused to rotate. The pinion 30 is in mesh with the spur gear 26 rotatable about the pin 27 and transmitting its rotary motion to the element 25 fitted with a toothed rim. The element 25 owing to rotation moves with its internal thread 24 on the external thread 23 of the bush 7 stationarily disposed in the wall 2 and, during its rotation, simultaneously carries out an axially directed motion relative to the driving shaft 20 and the driven shaft 4. This axial motion is transmitted by the element 25 to the sleeve 40 which owing to the interposed bearing 41, 42, 43, 44, 45, 46 does not rotate.

The adjustment effected by the control shaft 30 results therefore in the transmission of axial motion to the sleeve 40 and thus to the rack 69 arranged on the sleeve. The rack 69 is in mesh with a toothed wheel 67 which owing to the axial motion of the rack is caused to rotate. Owing to this rotation opposite motion, i. e., radially to shafts 4 and 20, is imparted to the toothings 66 and 68 right angularly arranged relative to the rack 69 and in mesh with the toothed wheel 67. For example, if the member 68 moves inwardly, i. e., if the carrier 53 connected with the member 68 is moved in the direction of its central position, the member 66 will move outwardly in opposite direction and thus effect motion of the members 62, 63, 64 secured to the member 66. If the toothed wheel 67 moves in the other direction, the guide ring carrier 53 and thus the ring 60 will move outwardly, so that the balancing disc 64 is also moved outwardly to the same extent, though in opposite direction to the eccentric member. In this manner complete balancing of the eccentric members is attained at any position of the eccentric member.

The centrifugal forces developed during rotation of the eccentrically adjustable carrier 53 and of the guide ring 60 are taken up by the disc 64 which, according to the eccentric adjustment of the guide ring 60, moves more or less radially relative to the driving shaft 20 in a direction opposite to that of the members 53 and 60. As the toothings 66 and 68 of the guide pieces 63 or of the guide ring carrier 53 engage one and the same toothed wheel 67, perfect balancing of masses is automatically effected at each adjusted eccentricity. Simultaneously, the axial pressure developed by the centrifugal forces of the eccentrically adjustable parts and transmitted by the toothed wheel 67 to the rack 69 ceases with the result that unilateral stressing of the double-acting thrust bearing 41—46 is avoided.

I claim:

1. A device for regulating the speed of rotating parts by means of a member adjustable as to eccentricity during operation, comprising a driving shaft, a rack axially displaceably arranged outside the driving shaft, a toothed wheel in mesh with the rack, a toothing forming part of the eccentrically adjustable member radially movable relative to the driving shaft, said toothing being in mesh with said toothed wheel, and a toothed member radially movable relative to the driving shaft for compensating the centrifugal forces of the eccentrically adjustable member, the toothing of said member also engaging said toothed wheel.

2. A device according to claim 1, comprising an axially adjustable internally threaded element, said element being in swivelled connection with the rack, a stationary externally threaded member on which said element is axially displaceable and transmission gears whereby said element may be adjusted from without during operation.

3. A device according to claim 1, comprising an axially adjustable internally threaded element and a bearing between said element and the rack for taking up axial and radial pressures.

4. A device for regulating the speed of rotating parts by means of a member adjustable as to eccentricity during operation, comprising a driving shaft, a rack axially displaceably arranged relative to the driving shaft, a toothed wheel in mesh with the rack, a toothing forming part of the eccentrically adjustable member radially movable relative to the driving shaft, said toothing being in mesh with the toothed wheel, an axially adjustable element and a bearing between said element and the rack, said bearing taking up axial and radial pressures, the axially adjustable element being internally threaded, and a stationary externally threaded member on which the element is axially displaceable and transmission gears whereby said element may be adjusted from without during operation.

5. A device for regulating the speed of rotating parts by means of a member adjustable as to eccentricity during operation, comprising a driving shaft, a rack axially displaceably arranged relative to the driving shaft, a toothed wheel in mesh with the rack, a toothing forming part of the eccentrically adjustable member radially movable relative to the driving shaft, said toothing being in mesh with the toothed wheel, an axially adjustable internally threaded element, said element being in swivelled connection with the rack, a stationary externally threaded member on which said element is axially displaceable and transmission gears whereby said element may be adjusted from without during operation.

RICHARD SEIDEL.